(12) United States Patent
Tafazolli et al.

(10) Patent No.: US 7,707,278 B2
(45) Date of Patent: Apr. 27, 2010

(54) RECONFIGURATION MANAGEMENT ARCHITECTURES FOR MOBILE COMMUNICATION SYSTEMS

(75) Inventors: Rahim Tafazolli, Cheam (GB); Klaus Moessner, Hohberg-Diersburg (DE); Seiamak Vahid, Wiltshire (GB)

(73) Assignee: University of Surrey, Guildford (GB)

( * ) Notice: Subject to any disclaimer, the term of this patent is extended or adjusted under 35 U.S.C. 154(b) by 1217 days.

(21) Appl. No.: 10/432,293

(22) PCT Filed: Nov. 20, 2001

(86) PCT No.: PCT/GB01/05132

§ 371 (c)(1), (2), (4) Date: Sep. 11, 2003

(87) PCT Pub. No.: WO02/43422

PCT Pub. Date: May 30, 2002

(65) Prior Publication Data

US 2004/0049561 A1    Mar. 11, 2004

(30) Foreign Application Priority Data

Nov. 22, 2000 (GB) ............................ 0028463.8

(51) Int. Cl.
*G06F 15/177* (2006.01)
(52) U.S. Cl. .................. 709/221; 717/121; 713/100
(58) Field of Classification Search ............. 717/121
See application file for complete search history.

(56) References Cited

U.S. PATENT DOCUMENTS

| | | | | |
|---|---|---|---|---|
| 5,699,350 A * | 12/1997 | Kraslavsky | ................. | 370/254 |
| 5,999,990 A | 12/1999 | Campini et al. | | |
| 6,052,600 A * | 4/2000 | Fette et al. | ................. | 455/509 |
| 6,278,449 B1 * | 8/2001 | Sugiarto et al. | ............. | 715/826 |
| 6,535,979 B1 * | 3/2003 | Vialen et al. | ................ | 713/163 |
| 6,721,872 B1 * | 4/2004 | Dunlop et al. | ................ | 712/28 |
| 6,954,634 B1 * | 10/2005 | Bucknell et al. | ............ | 455/418 |
| 6,988,133 B1 * | 1/2006 | Zavalkovsky et al. | ....... | 709/223 |
| 7,151,925 B2 * | 12/2006 | Ting et al. | ................... | 455/418 |
| 7,404,074 B2 * | 7/2008 | Murotake | ................... | 713/100 |

(Continued)

FOREIGN PATENT DOCUMENTS

GB    2350749 A    *    6/2000

(Continued)

OTHER PUBLICATIONS

Moessner et al., Terminal Reconfigureability—The Software Download Aspect, Mobile Communication Technologies, 2000, pp. 326-330, No. 471.

(Continued)

*Primary Examiner*—Wei Y Zhen
*Assistant Examiner*—Phillip H Nguyen
(74) *Attorney, Agent, or Firm*—Leydig, Voit & Mayer, Ltd.

(57) ABSTRACT

A reconfiguration management architecture for a mobile communications system which includes a network and at least one software-definable terminal comprises a configuration management part (10) within the or each terminal and a configuration control part (20). The configuration management part (10) implements a proposed configuration to reconfigure the terminal provided the configuration control part (20) validates the proposed configuration.

22 Claims, 5 Drawing Sheets

U.S. PATENT DOCUMENTS

Figure 1:
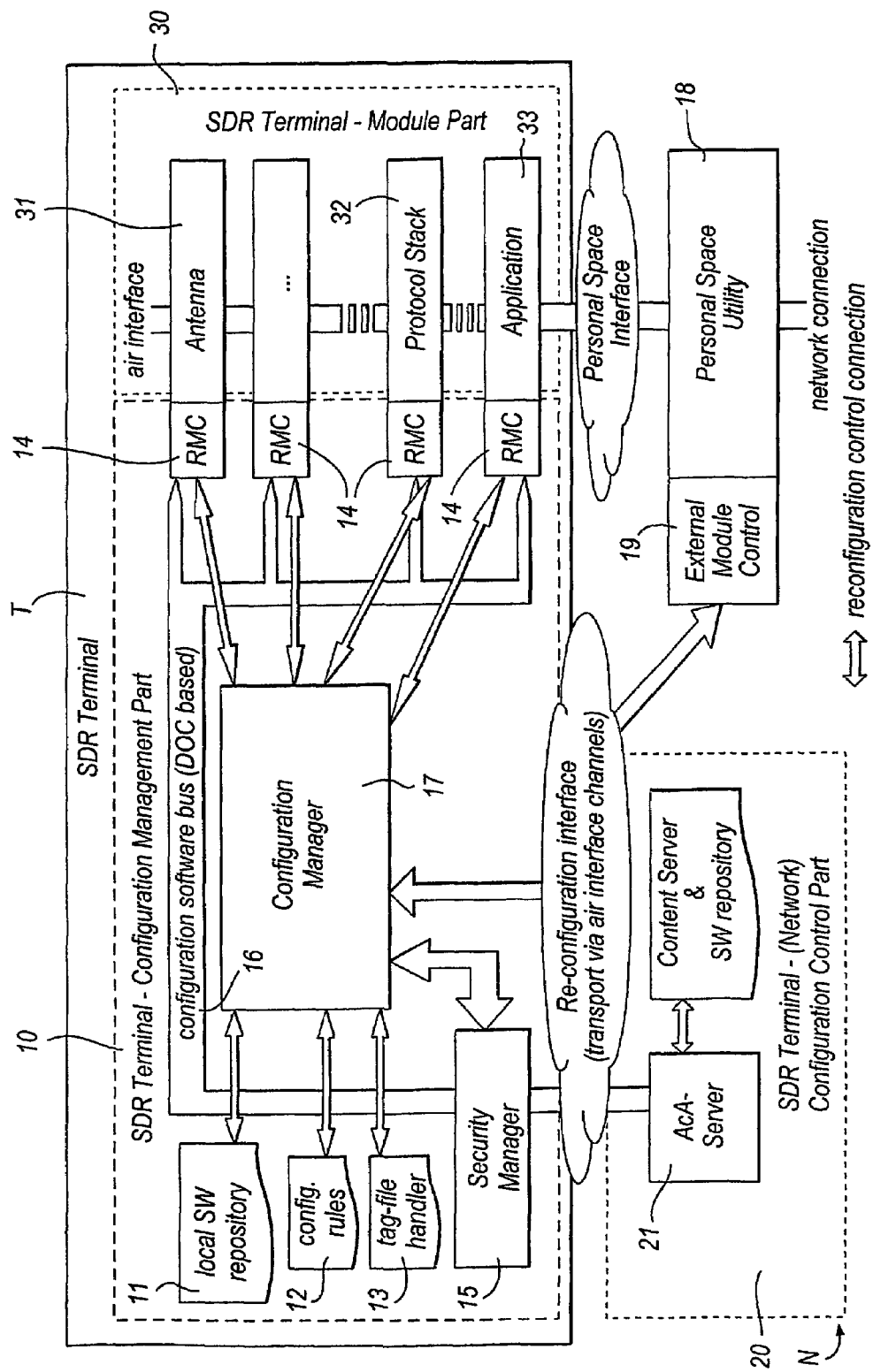

2001/0029529 A1 * 10/2001 Tachibana et al. ........... 709/220

FOREIGN PATENT DOCUMENTS

| GB | 2350749 A * | 12/2000 |
| GB | 0 353 918 | 3/2001 |
| WO | WO 01/88707 | 11/2001 |
| WO | WO 01/88707 A2 * | 11/2001 |

OTHER PUBLICATIONS

Cummings et al., Mode Switching and Software Download for Software Defined Radio: The SDR Forum Approach, IEEE Communications Magazine, Aug. 1999, pp. 104-106, IEEE Service Center, vol. 37, No. 8.

Mitola, The Software Radio Architecture, IEEE Communications Magazine, May 1995, pp. 26-31, IEEE Service Center, vol. 33, No. 5.

6.0 Software Download Implementation Recommendation, SDRF Technical Report 2.2, Nov. 1999, pp. 1-77, Chapter 6, Rev. 3.

Kung, A Model for Reusability Based On Java and Corba, 1997, pp. 1-15, Trialog, Paris, France.

Biswas et al., The IEEE P1520 Standards Initiative for Programmable Network Interfaces, IEEE Communications Magazine, Oct. 1998, pp. 64-70.

Biswas et al., IEEE P1520 Application Programming Interfaces for Networks: An Introduction http://www.ieee-pin.org/; The IEEE P1520-A presentation at OpenArch Conference, New York; Mar. 27, 1999.

Digital cellular telecommunications systems (Phase 2+); Mobile Station Application Execution Environment (MexE); Service description; Stage 1 (GSM 02.57 version 7.1.0 Release 1998), ETSI TS 101 741, Aug. 1998, pp. 1-21, v 7.1.0, 1998.

* cited by examiner

RECONFIGURATION MANAGEMENT ARCHITECTURES FOR MOBILE COMMUNICATION SYSTEMS

This invention relates to mobile communication systems including one or more software-definable terminal and the invention relates particularly to reconfiguration management architectures for use in such systems.

Open terminal platforms and software reconfigureability are the crucial technologies to realise software-definable radios (soft-radios) and re-configureable network nodes (e.g. base stations). Terminals are evolving towards all-purpose radios that can implement a variety of different standards or protocols through re-programming. Elements at the physical and MAC layers are already programmable in different ways (http://www.ifn.et.tu-dresden.de/)eg. programmable encoders/decoders (via sets of parameters) and other blocks e.g. equalizer implementations. They need these additional capabilities to serve the increasing roaming and service delivery demands of future mobile applications. To support this new paradigm of communications (anytime, anywhere, whatever), terminals will need to be reconfigureable to different air interface standards. Early implementations of these multi-mode terminals used the "Velcro-approach" in which the operational mode is merely switched between two (or more) independent implementations of air interface standards within a single terminal. More recent developments are aiming at truly reconfigureable software architectures within network nodes; here the goal is to define any node by software only. Examples of research in this area include the OSAF (OMI Software Architecture Forum) project described by A. Kung in "A Model for Reusability Based on Java and Cobra" Trialog Whitepaper, Paris, 1997 (http://www.trialog.com/papaerreuse.html) and the efforts ongoing within the SDR Forum (Software Definable Radio Forum) (http://www.s-drforum.org), which both aim to specify reconfigureable open platforms. OPtIMA (Open Protocol Programming Interface Model & Architecture) described in our co-pending UK Patent Application No. 0011954.5 and IEEE P1520 described by Biswas J. et al in "Application Progamming Interfaces for Networks", Working Group on IEEE P 1520 on APIs for Networks, IEEE Communication Magazine, Vol 36, No 10, pp 64-70, October 1998 are examples of projects for reconfigureability of protocol stacks and finally MExE described in "Digital cellular telecommunications system (Phase 2+): Mobile Station Application Execution Environment (MExE)", ETSI TS 101 741 V7.1.0, 1999 and the MASE are delivering reconfigureability for application support (MExE is the Mobile Application Execution Platform currently being specified by 3GPP and the MASE a Mobile Application Support Environment, specified by the ACTS projects 'on the Move' (http://www.sics.se/-onthemove/) and 'MOVE' (http://www.uk.infowin.org/ACTS/RUS/PROJECTS/prtitm.htm)

Open terminal platforms provide, through their programmability, the means to reconfigure a soft terminal in a way that meets network and application specific requirements of any mobile communication network. Key to such flexibility and network/service adaptability is the concept of reconfiguration. Reconfigureability of soft-radio terminals need not be confined to the physical layer alone; it may include reconfigureability of protocol stacks and application support environments. An ideal soft-terminal should comprise a collection of radio/low/high level protocol modules separated by open interfaces and controlled via a reconfiguration interface. Each radio module could then offer its functionality (via the open interfaces) to the system and other modules, and could be reconfigured/exchanged via the reconfiguration interface.

Reconfigureability may be pursued in different ways: 1) using parameterised radio modules, 2) exchange of (a) single component(s) within a module and 3) exchange of complete radio modules. Complete reconfigureability of the protocol stack, for example, calls for introduction of flexible interfaces between protocol layers i.e. Protocol Programming Interfaces (PPIs) that replace the rather static service access points (see patent application no. 0011954.5). The example of OPtIMA enables reconfigureability through introduction of programming interfaces between protocol strata, providing the possibility to write both single protocols or whole protocol stacks in a manner similar to the way applications are written in high level programming languages (e.g. Java applications use different APIs which are part of the class libraries with binding at runtime—this means that the functionality is out-sourced to the API and the application simply defines the sequence and determines the parameters passed to methods within the APIs). This, or comparable/similar design principles will need to be applied to enable reconfiguration in future network nodes/soft terminals.

Reconfigurable terminals and open platforms will enable third parties to provide and deliver software for the various modules (e.g. antenna, protocol stack, etc.) within a soft terminal; the types of software provided in this way may range from parameters for filter implementations or other parameterised radio modules to complete signalling applications/protocols. Reconfiguration by parameter, or complete modules can cause different effects to the terminal configuration. The main problem occurring with completely programmable radios is how to ensure that any possible combination of software modules and therefore any possible terminal configuration complies with one or more existing air interface standards and the benchmarks set by the relevant standardization authorities. Whilst, currently, mobile terminals have to be test approved and the terminal manufacturers are required to ensure the standard compliance of their products, this will not be possible any more once terminals are completely reconfigurable and reconfiguration software can be obtained from a wide range of sources. Additionally, the possibility may occur in which different software implementations for different software elements can be obtained from different providers or vendors, in which case the responsibility to ensure standard compliance cannot be assigned to one particular party but several. To summarize: each module within a soft terminal may be configured (and also re-configured) independently, and reconfiguration, whether partial (i.e. with effect to only one module (e.g. antenna)) or complete (i.e. with effect to all modules), may cause the terminal to adapt to a different access scheme.

The inventors have appreciated that when re-configureable terminals are based on open platforms and users have the possibility to implement and run within their terminals a variety of software elements that they may obtain from different sources, then reconfiguration and reconfiguration control and management, cannot be confined or delegated to the terminal alone. This means, that if users (or even applications) have the possibility to initiate a terminal reconfiguration and moreover to nominate the software to be installed and to apply user defined terminal functionality, the network authorities (i.e. network operator/service provider) will need to authorize the reconfiguration of the soft terminal. Additionally, since network operators are responsible for the efficient use of their limited radio resources (i.e. spectrum), they must have the means to ensure complete adherence to approved standards.

To give an example, it is envisaged that object or component-based implementations of protocol (all layers) software implies embedding various protocol functionalities encapsulated within individual elements (i.e. objects or components). Such elements will interact with other elements within the same layer or across different layers of the protocol stack via well defined (to be standardised) interfaces. These elements will therefore contain implementations of protocol functionalities (or parts thereof) as well as these interfaces. In each of the three undermentioned categories of reconfiguration it will be necessary to ensure proper exchange/replacement of parameters (i.e. references) between the newly introduced element(s) and those already established within the current configuration.

The three categories are as follows:

(1) Partial reconfiguration of any layer (or part thereof) within an existing standard implementation.

Partial reconfiguration refers to exchange/update/replacement of one or more elements within a given protocol layer. Such need arises e.g. when a new/optimised functionality is to be introduced to the terminal (e.g. a new/optimised call control protocol element). As previously mentioned, the reconfiguration mechanism depends on compliance to the published/open interfaces in order to guarantee proper functioning of the new/optimised element.

(2) Complete reconfiguration of any given layer

Complete reconfiguration refers to exchange/update/replacement of one or more complete protocol layer within a given protocol stack. Compliance to published/open interfaces between strata ensures proper operation of the layer/stack subsequent to this exchange/replacement.

(3) Full reconfiguration of a complete stack.

Full reconfiguration refers to exchange/replacement of the full protocol stack by another existing standard or even a custom/proprietary non-standardised protocol stack. Once again compliance to standardised interfaces is presumed.

The foregoing considerations present a significant technical problem in the development of reconfigureable terminals, such as software-definable radio (SDR) terminals. It is an object of the present invention to provide a reconfiguration management architecture that at least alleviates the problem.

According to one aspect of the invention there is provided a reconfiguration management architecture for a mobile communications system including a network and at least one software-definable terminal, said architecture comprising configuration management means located within the or each said terminal for defining a proposed configuration of the terminal and configuration control means located within the network and capable of validating the proposed configuration defined by said configuration management means, said configuration management means being arranged to implement the proposed configuration to reconfigure the terminal provided validation of the proposed configuration by said configuration control means has been given.

It will be understood that the term software definable terminal is intended to embrace a software definable radio (SDR) terminal as well as software definable network nodes such as base stations.

Reconfiguration management architectures according to the invention provide a distributed configuration management scheme capable of enabling network providers to influence, authorise and control terminal reconfiguration. The scheme has the capability to support (1) a mechanism that allows type approval testing/compliance to standards and still supports the use of open platforms (and thus the provision of software by any third party), or the more progressive approach (2) where no formal test approval mechanisms (in the traditional sense) are required and network nodes (terminals) can be freely reconfigured within the scope of standardised interfaces within the network node (terminal) i.e. compliance to these open/public interfaces is the only requirement as far as compliance is concerned. Thus it is proposed that for SDR Terminals a mere compliance testing of the interfaces within the downloaded software is sufficient to indicate adherence to an existing radio standard.

In a preferred implementation of the invention, the configuration management means is arranged to generate a definition of the proposed configuration. This definition (referred to hereinafter as a configuration tag-file) may include information representing configuration rules determined to be permitted by the network for rconfiguration of the terminal type and information identifying the location of software required to implement the proposed configuration. The configuration tag-file provides the basis for a test procedure (referred to hereinafter as 'virtual configuration') which is either terminal or network-based and is designed to simulate operation of the proposed configuration, enabling acceptability of the proposed configuration to be assessed and validated. For example, the test procedure may be designed to test for compliance with the afore-mentioned open interfaces of the terminal. The configuration management means will only implement the proposed configuration if, as a result of the test procedure, it is validated by the reconfiguration control means in the network.

Figure 2:
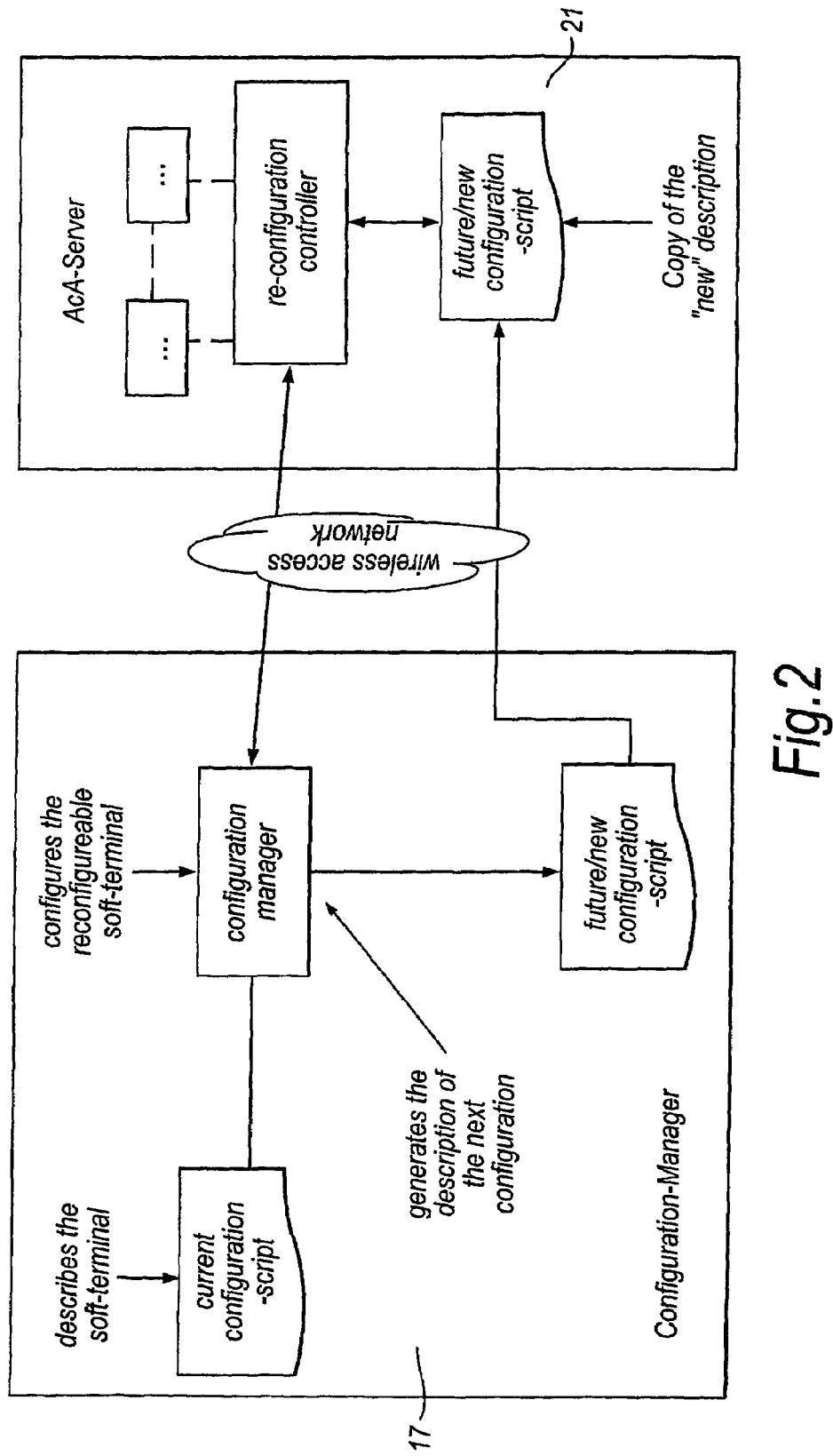
Figure 3:
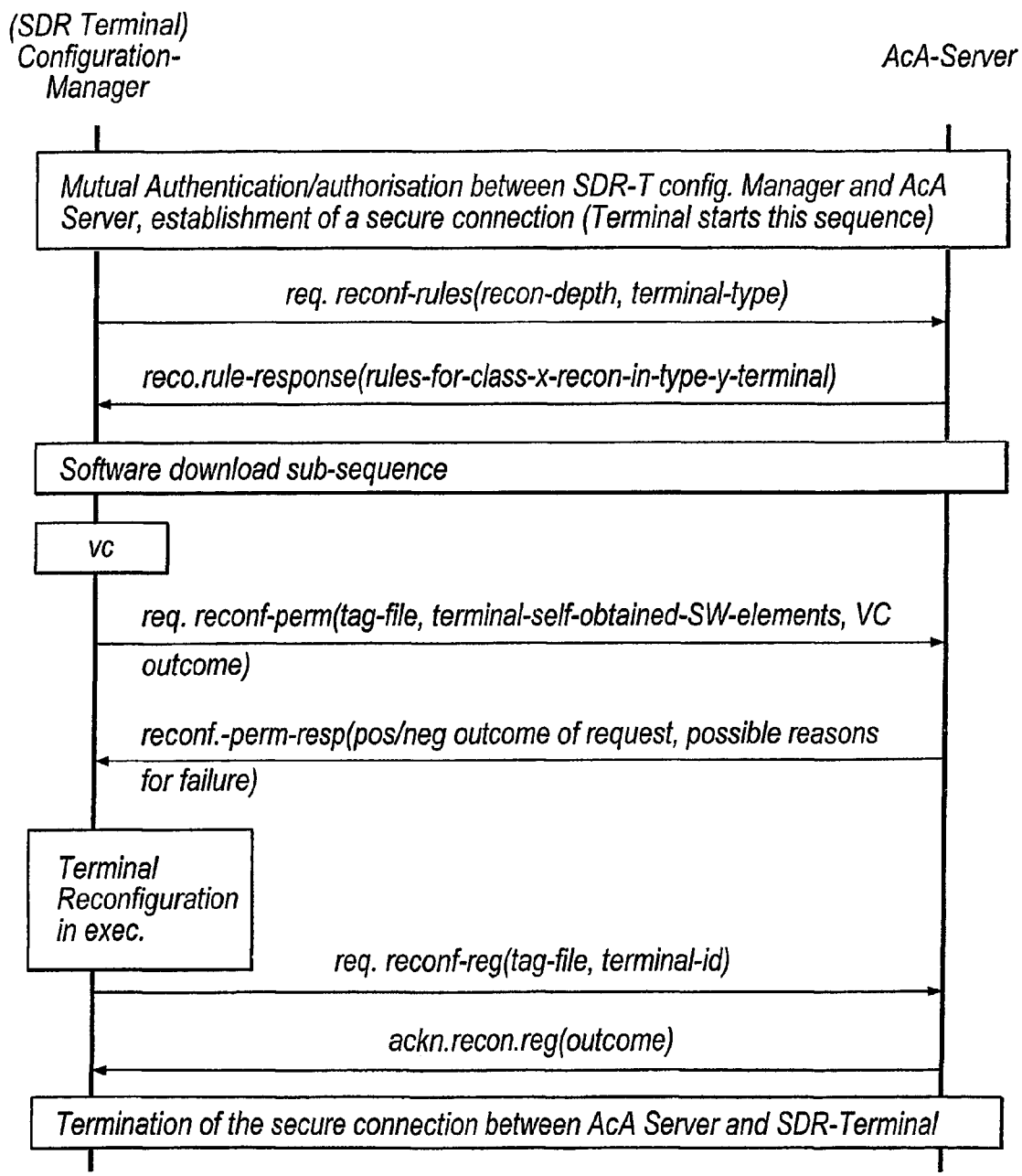
Figure 4:
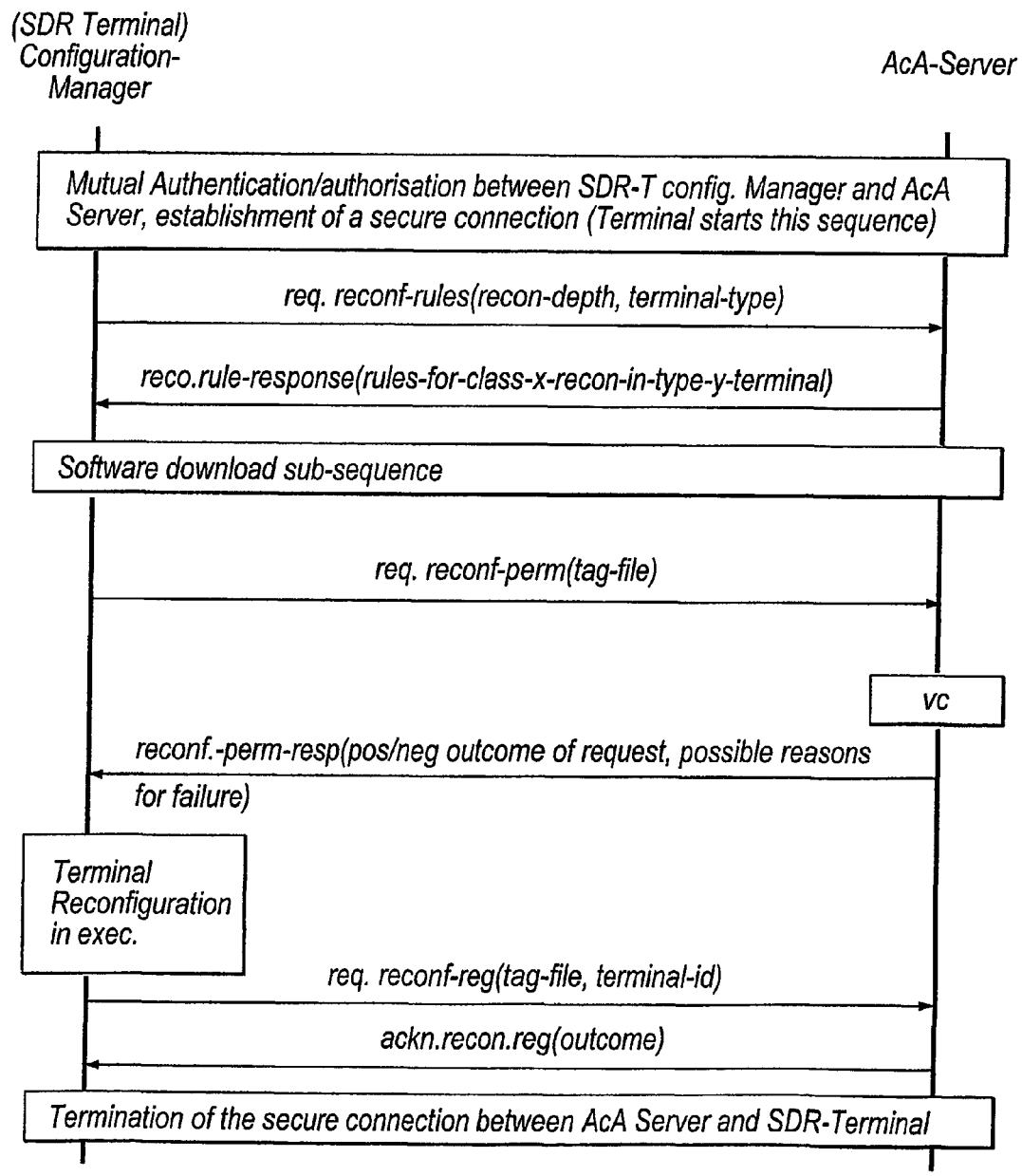
Figure 5:
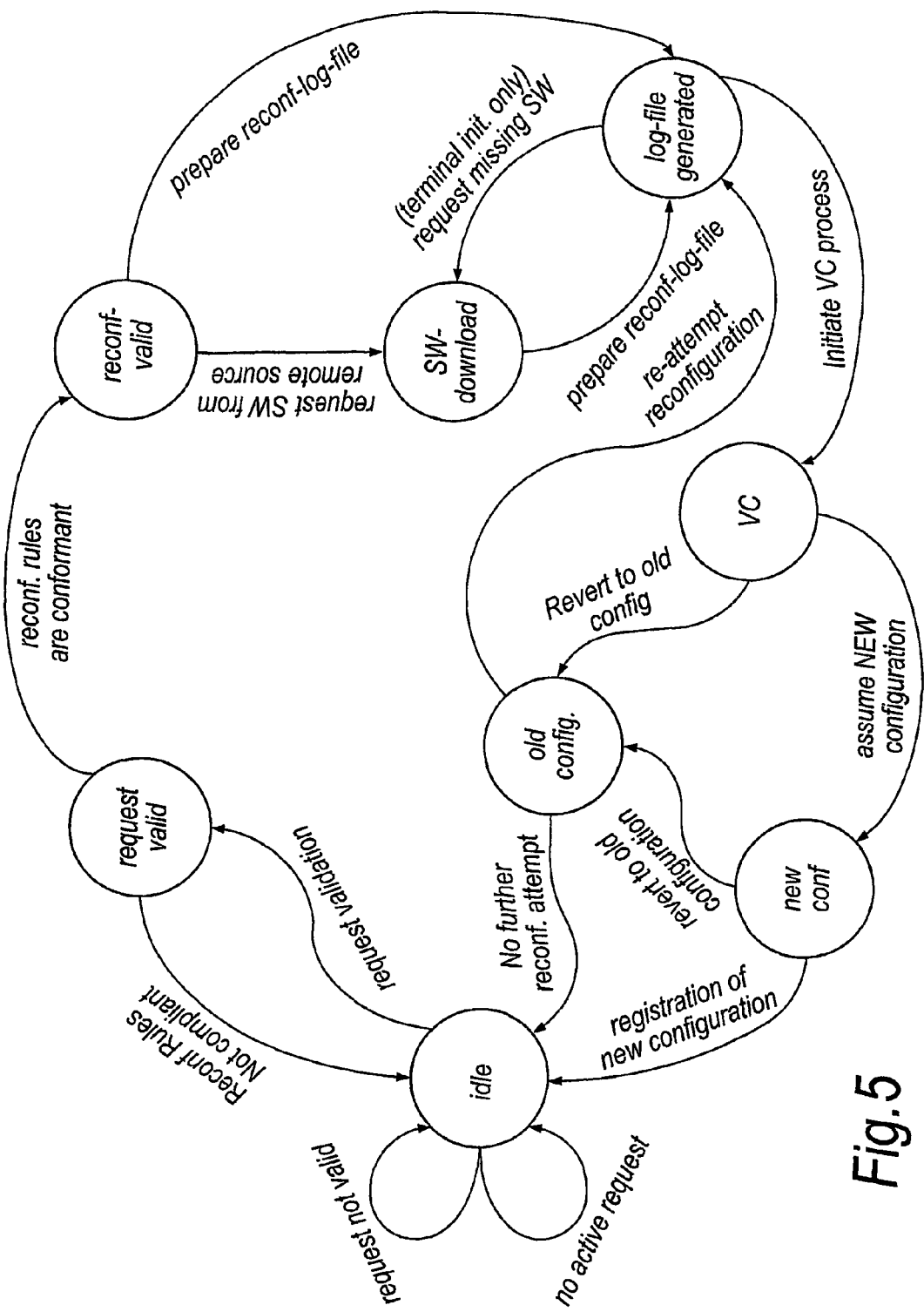

Embodiments of the invention are now described, by way of example only, with reference to the accompanying drawings of which:

FIG. 1 is a schematic representation of a reconfiguration management architecture according to the invention, FIG. 2 illustrates, in greater detail, the configuration manager and the AcA Server of the reconfiguration management architecture of FIG. 1, FIG. 3 is a flow diagram illustrating terminal-controlled, network-assisted virtual configuration, FIG. 4 is a flow diagram illustrating network-controlled, terminal-assisted virtual configuration, and FIG. 5 shows a reconfiguration management finite state machine.

Referring now to FIG. 1, the reconfiguration management architecture is distributed between a software definable radio (SDR) terminal T and the network N. More specifically, the reconfiguration management architecture comprises two main parts; namely, a configuration management part 10 located within the terminal T and a configuration control part 20 located within the network N. The terminal T also contains a module part 30 (which is the reconfigureable communication part of the terminal) comprising a plurality of modules including the physical layer 31 (e.g. antenna software layer), the protocol stack 32 and the application layer 33.

The configuration management part 10 comprises a local software repository 11, a configuration rule repository 12, a 'tag-file' handler 13, a plurality of reconfiguration module controllers 14, a security manager 15, a middleware based configuration software bus 16 and a configuration manager 17.

Reconfiguration management is, as mentioned, a shared responsibility between network and terminal. Furthermore, the complete management system consists of a number of parts (as shown in FIG. 1). In this embodiment, the necessary influence of a network authority is reflected in the network counterpart of the reconfiguration process, i.e. a re-configuration supporting entity has to be available/resident within the network. This, 'SDR Terminal—(Network) Configuration Control Part' 20 consists of a server 21 (i.e. an AcA server), which, in this embodiment, validates new configurations by executing the virtual configuration procedure. Such a unit may be resident within the access network or in the backbone network. The core of the reconfiguration management system is the 'Configuration Manager' 17 within the 'SDR Terminal'—Configuration Management Part' 10. This core unit co-ordinates all other parts (within and outside the terminal) of the reconfiguration management sub-system and implements the reconfiguration protocol (assuming that it has been validated).

Reconfiguration management is not only distributed between terminal and network, but also within the terminal itself; the local 'Reconfiguration Management Controllers' (RMC) 14 implement the reconfiguration (initiated by the Configuration Manager) in the individual modules of the 'SDR Terminal—modules' 30 (i.e. the reconfigureable communication part of the terminal such as the protocol stack module). The same concept applies for external peripherals of the terminal (e.g. personal space utilities 18 such as use of a TV screen as a display, etc.), where reconfiguration will be managed on a 'External Module Controller' (EMC) 19. Furthermore, there are the additional, supportive units within the SDR Terminal—Configuration Management Part 10. The local software repository 11 stores all software necessary for terminal configuration, the configuration rule repository 12 stores the list of reconfiguration classes/degrees allowed by the network provider for the used terminal type 12, the 'tag-file' handler 13 keeps, reads, generates and alters 'tag-files' and the security manager 15 is responsible for establishing, maintaining and terminating secure connections between the different management units and to prevent malicious reconfiguration requests.

The middleware based configuration software bus 16 (e.g. RMI, CORBA, DCOM) facilitates the transport of software elements between the different units and is also used as a platform for communication between the distributed reconfiguration management and control units.

The security manager 15 is provided in order to ensure secure and authorised exchange and download of reconfiguration information and software between different parts of the architecture. It is envisaged that, due to different security requirements, security protocols of varying degrees of complexity/capability could be employed without impact on the architecture and the procedures outlined.

Software required to implement the reconfiguration is either terminal resident or can be obtained from external sources.

Software for reconfiguration purposes may be obtained from various internal/external sources and methods of download could include OTA download, specific vendor outlets, the Internet or smart card downloads as described, for example, in Terminal reconfiguration: "The Software Download Aspect" by K. Moessner, R. Tafazolli, First International Conference on 3G Technology, IEE-3G2000, London, Mar. 19-23, 2000 or self obtained software (e.g. self written). Reconfiguration Management has to ensure the reliability and trustworthiness of any software element, independent of its source.

The terminals or rather their configurations, are defined, using a script (languages such as Java-Script, HTML or XML—or other possible customised subsets of these may be used for this purpose). These scripts, referred to herein as configuration tag-files contain information about the complete terminal software configuration and the structure of how single software entities are employed. The original (the "boot") tagfile defines the initial terminal configuration and is accessed during the "boot" period of the terminal, and in case the terminal undergoes a reconfiguration, a new tag-file, containing all information necessary for the new configuration, is generated. Tag-files need to contain, inter alia, information about software name, version and location of the source from which the software entity was/is obtained (e.g. an URL or other resource locator).

If a reconfiguration request arrives, the Configuration Manager 17 first requests the configuration rules (which will depend on type of terminal and reconfiguration, etc.), obtains the software necessary to undertake the reconfiguration and then generates the new tag-file (i.e. the 'new' SDR Terminal description). After generation of the new tag-file the Configuration Manager initiates a virtual configuration (VC) procedure. In the case of a network-controlled VC, the terminal-resident Configuration Manager 17 forwards the tag-file to the network-resident counter-part of the Configuration Management Part, i.e. the reconfiguration controller shown in FIG. 2. Within the AcA server, the tag-file is interpreted and a virtual configuration takes place, prior to which the tag-file delivers all information necessary to obtain the reconfiguration software from whichever source. In the event that the software cannot be obtained from 'public' sources, an upload has to be initiated, indicating user-initiated nature of the configuration procedure. Once all software entities necessary are available at the server, the virtual configuration can take place, whereby all software modules listed in the tag-file are required to simulate the proposed configuration of the terminal. If the virtual configuration fails, the terminal Configuration Manager must halt the reconfiguration process and revert to the old (current) configuration. Otherwise, the reconfiguration procedure can continue.

The Reconfiguration Module Controller 14 and the External Module Controller 19 are the entities that finally implement the reconfiguration within a terminal (or external) module provided validation of the proposed configuration has been confirmed by the configuration control part 20. Any reconfiguration software can be considered as wrapped into a streamable object; this simplifies handling and transport of software entities. Communication and transport of these objects (between the single parts within a SDR Terminal) is accomplished via the configuration software bus 16 and directed by the Configuration Manager 17.

The reconfiguration procedure may be either terminal- or network-controlled. In either case a secure virtual configuration (VC) takes place in order to pre-empt the possibility of loosing a working configuration within the terminal, for example. Furthermore, the security of the (virtual) reconfiguration process, akin to isolated/sandbox approach in Java, ensures that no infected or malicious code can find its way to the terminal and result in unpredictable consequences. This applies to application reconfiguration as well.

(1) Terminal-controlled, network-assisted

In this case, a virtual configuration takes place within the terminal whereby the required software element(s) are presumed to have been downloaded, though not yet integrated. As shown in FIG. 3, the VC takes place immediately after the software download sequence. Upon completion of the virtual configuration procedure, a message 'req_reconf_perm()' is delivered to the network seeking permission to proceed with the actual reconfiguration to the new/modified element/layer/stack. Upon receiving a positive response from the network, the reconfiguration is executed and the new tag-file is forwarded to the network.

(2) Network-controlled, terminal-assisted

In this case a virtual configuration takes place within the network (e.g. AcA server) whereby the required element(s) are presumed downloaded/available. As shown in FIG. 4, upon reception of message 'req_recon_perm()' the AcA server initiates the virtual reconfiguration procedure and returns the results to the terminal in the message 'reconf_perm_res()'. In case of failure, the message will indicate possible reasons with an error code.

In a particular implementation, the VC procedure verifies compliance/conformance of the new/downloaded code to published/open interfaces. The compliance test is carried out by passing (via the interfaces) a number of dummy parameters and observing the resulting response from the software element (object).

Referring now to FIG. 3, the illustrated terminal-controlled, network-assisted procedure consists of following steps:
1. Terminal initiates a mutual authentication sequence to establish a secure channel between terminal and AcA (this 'sub-sequence' is not defined here).
2. Terminal requests the set of rules for the intended reconfiguration. The parameters to be passed describe: reconfiguration depth, radio module and terminal type.
3. AcA acknowledges the request and forwards the reconfiguration rules according to depth and terminal type.
4. The terminal then downloads the software from the intended source (i.e. from a local storage element, from a URL via the network, from the AcA server).
5. The Configuration Management Part 10 within the terminal performs a VC and the results of the operation are reported back to the network in message "reconfiguration-request-permission".
6. Request for permission for terminal reconfiguration; the message forwarded from the Terminal to the AcA server carries a tag-file, if applicable, the self-obtained software element or the URL of the source from which the element was obtained and additionally the outcome of the VC process, as parameters.
7. The AcA server responds with a 'reconfiguration-request-response message-the outcome of the request and possible error messages are parameters of this message.
8. Once the reconfiguration within the terminal is implemented, the terminal will send a 'reconfiguration-registration-request' containing the new tag-file to the AcA server to register the current set-up of the terminal.
9. AcA responds with an acknowledgement to the registration message.
10. The secure connection between terminal and AcA becomes terminated.

The sequence for a network-controlled, terminal-assisted sequence shown in FIG. 4 corresponds in most parts to the terminal-controlled procedure; however, the main difference is that the VC is now carried out within the AcA server.

The reconfiguration process can be triggered from either the terminal or the network side.

Re-Configuration process control and validation is performed within the network—in this embodiment, within the AcA-Server (in the case of network controlled VC). The AcA-Server provides multiple functions including:

Authentication/Authorisation/Encryption: the server ensures that reconfiguration software has been obtained from trusted sources only, or that the subscriber has authorised the download of this software module. Furthermore, it ensures the secure and possibly encrypted download of approved software (i.e. software provided by the network provider).

Virtual configuration: the AcA server performs the virtual configuration indicated in the tag-file delivered from the configuration manager within the SDR-terminal to the "re-configuration-controller" unit with the AcA server, and issues an either positive or negative acknowledgement to the configuration manager unit.

Accounting/Billing for service provision: software download and reconfiguration of terminals is a costly service, and network operator/service providers will need the facility to charge for these value added services. The AcA server may collect resource consumption data to support trend analysis, cost allocation, auditing, and billing.

Functionality and interactions of the described reconfiguration management system are represented in the form of a finite state machine (FSM). The state machine controls and maintains reconfiguration procedures and current settings, respectively. Once a reconfigureable soft terminal is switched on, it undergoes a boot-process and assumes the last known configuration (as defined in the last known tag-file). The reconfiguration manager will then be in an idle state until any external event triggers or requests a reconfiguration procedure, as shown in FIG. 5.

In this embodiment, eight major states describe the functionality of the reconfiguration management architecture; each of these states represents the temporary conditions and serves a set of specified tasks with the aim of ensuring reliable execution of both types of reconfiguration procedures (i.e. terminal and network initiated). The reconfiguration states are:

IDLE—Once the boot process is accomplished and the last known (validated) configuration is assumed, the configuration manager unit assumes idle state, it maintains the current configuration and merely awaits any request/triggers for reconfiguration from either outside or within the terminal. Possible transitions from this state are triggered by either internal or external requests for reconfiguration or by system failures (i.e. failures are treated like requests for reconfiguration).

REQUEST VALID—Is the state in which a request for reconfiguration, or the failure of a part of the system, is recognised. Requests may be discarded for either not being valid or not being classifiable to one of the recognised reconfiguration categories.

RECONFIGURATION VALID—This state can only be assumed when the requested reconfiguration has been compared with and complies to both configuration rules and terminal capability list. The reconfiguration manager accesses a database containing these configuration rules to identify whether the terminal is capable of supported the requested reconfiguration.

CONFIGURATION-TAG-FILE PREPARATION—A configuration tag-file is generated containing the detailed description and source locators for the software units for the intended configuration. All software units are either resident within the terminal's local memory or are to be obtained externally via a download sequence.

SW DOWNLOAD—Strictly, SW download is not a real state, but is the abstraction of a complete sub-state machine executing software download. It is a core part of reconfiguration management, the basic functionality and task is to obtain software entities from sources other than the local SW store and to provide references of these SW entities to the reconfiguration manager, and also to ensure the trustworthiness and reliability of the obtained software entities.

VC PROCESS—Any terminal configuration needs to be approved and tested before it can be applied. This prevents fraudulent interference of possible malicious third parties during reconfiguration and also ensures that the terminal complies with the requirements and standards of the radio interface.

OLD CONFIGURATION—The state 'old configuration' represents the current active configuration of the terminal. The terminal reverts to/remains in this configuration if the new configuration fails the conformance evaluation or design rule check. The reconfiguration manager then has either to re-initiate the reconfiguration process or has to abandon the reconfiguration, and the terminal continues operation in the old configuration.

NEW CONFIGURATION—Once the design rules are validated and conformance of the new configuration is ensured, the configuration manager has to inform the requesting network and local entity about the reconfiguration of the terminal and has to register the tag-file with the AcA server.

Referring now to FIG. 5 in more detail, initially the state machine assumes the state IDLE. If no, or a non-authorized, request for reconfiguration occurs, the configuration manager remains in the IDLE state and supports normal communication functionality. However, any request for reconfiguration will trigger a transition into the intermediate REQUEST VALID state. In case the terminal does not support the required category of reconfiguration, the state machine reverts to IDLE. When the requested reconfiguration can be supported, the FSM reaches the state RECONFIGURATION VALID. If all required software elements are locally available, a reconfiguration-tag-file is generated and a TAG-FILE-GENERATED state is assumed. Otherwise, the terminal requests the SW module from a remote SW store during a download sequence (SW DOWNLOAD). Once all software elements are available, the tag-file becomes generated/completed and the TAG-FILE-GENERATED state assumed. A case may occur in which the tag-file has been generated without all software elements being available. Then a SW download procedure has to be initiated. The intended and prepared configuration has to undergo a test validation procedure in the form of a Virtual Configuration (VC PROCESS). Depending on the result, the FSM either reverts to the OLD CONFIGURATION state or executes the reconfiguration and assumes the NEW CONFIGURATION state. In case of an error occurring during establishment of the new configuration (i.e. the new configuration is not validated), the terminal reverts to the OLD CONFIGURATION state. The terminal may then reattempt the reconfiguration process by altering entries within the tag-file (TAG-FILE-GENERATED). The alternative would be to return to IDLE, abandoning the reconfiguration and to the maintain the old configuration. If, however, the reconfiguration procedure is successful, the FSM registers the new configuration and makes a transition to the IDLE state.

The responsibility for reconfiguration management in this architecture can be viewed as a shared responsibility between the network operator/service provider and the terminal (i.e. the subscriber). The proposed sequence not only describes the steps required during an actual reconfiguration operation, but also forms the proposed framework that allows for self-approval and validation of SDR terminals or allows the commercial bodies to remain responsible for performing test-approvals. In the latter case, they will need to be able to emulate the procedures and steps outlined in FIGS. 3 to 5 in order to ascertain compliance/conformance of SDR terminals.

In summary the described reconfiguration management architecture has the following advantageous features:

Design—and identification of required functional elements—of a reconfiguration management architecture capable of supporting a reconfiguration protocol.

Distribution of reconfiguration management functions for SDR terminals, between the network and terminal. This distributed reconfiguration management system consists of a terminal-resident "Reconfiguration Manager Unit" and a network resident "Reconfiguration Controller Unit".

The introduction of the functional aspects of a "Configuration Manager" unit (as proposed initially in patent application No. 0011954.5) responsible for:

Managing the distributed nature of the various functional blocks within the "SDR Terminal-Configuration Management Part" of a soft terminal. These include (see FIG. 1): (1) a repository for reconfiguration rules, (2) a local SW element repository, (3) a configuration tag-file generator and interpreter, (4) various 'RMC-interface' units, (5) a (possibly CORBA based) configuration software bus and (6) a Configuration Manager Unit controlling and managing the aforementioned functional blocks (1-5).

Authentication and authorisation of the source of reconfiguration request (user initiated process: user-specified source e.g. a URL, open source, user-designed/defined software or network-initiated process: from the software repository within the mobile network.

Validation of feasibility of the intended reconfiguration request (via terminal capability negotiation).

Download of the necessary software updates/elements from source to the AcA server in the network if initiated by the user; otherwise the required software may be assumed resident/available in the AcA server.

Generate the proposed/new configuration tag-file according to the intended configuration.

Forward the tag-file to the network AcA server (the server is required to maintain a copy of the last configuration tag-file.

In the case of a network-controlled, terminal-assisted process, the virtual configuration takes place within the AcA server, and the result of the process is forwarded to the terminal.

If the VC procedure response was positive, then the terminal enters into a reconfiguration phase under the control of Configuration Manager and executes reconfiguration to the new settings.

If the reconfiguration process is not successfully completed or does not result in a working configuration, an error-log is generated and stored within the terminal. A return to the old/working configuration is now necessary (using the original configuration tag-file) whereafter the error-log is transmitted back to the network for diagnosis and further analysis.

The introduction of functional aspects of a "Reconfiguration Controller" unit—at the network side—, responsible for:

Provision of configuration rules provided according to the different SDR-T types and possible configuration categories. The rules may vary depending on the platform used and the degree to which the terminal is affected by a reconfiguration.

Execution and control of a "virtual reconfiguration" (VC) procedure that takes place within the network/or in the terminal and performs a functional test of the intended configuration. Software elements necessary to complete this VC are listed in the tag-file delivered from the Configuration Manager within the SDR-Terminal. The Configuration Control Part notifies the Configuration Manager within the SDR-T about the result of the "virtual configuration".

Registration of the terminal configuration after completion of the reconfiguration process within the terminal.

Introducing the concept of a "configuration tag-file, containing a definition of the current state/configuration of a SDR Terminal.

The tag-file contains (amongst other parameters) the identification of the source(s) from which reconfiguration software (in parts or as a whole) is to be/has been obtained.

Introduction and use of a local software repository to store downloaded reconfiguration software elements.

Use of a configuration rule repository, to provide terminal/network specific requirements for an intended reconfiguration.

Introduction of a security manager functional block (within the SDR Terminal-Configuration Management Part) to provide the security functionalities required due to the distributed structure of the reconfiguration management of the SDR Terminal.

Authentication/Authorisation (for software download from different sources).

Encryption/decryption (secure transmission of code and control messages).

A "sandbox-approach" to provide a secure/isolated environment during the execution of the VC protocol.

A "firewall mechanism" to protect the architecture from manipulation by external/unauthorised sources/entities.

Introduction and application of 'Reconfiguration Module Controllers' (RMC) that provide the means for reconfiguration management within the single reconfigureable modules of the 'SDR Terminal—Module Part'.

Messaging between the two peer entities (Configuration Manager & Configuration Control Part (i.e. the AcA server)) as well as inter-communication between various functional blocks within each of the peer entities, will be based on the client-server paradigm (and also further/advanced abstractions e.g. web-service model, XML, . . . ) exploiting as necessary the services offered by the middleware such as COBRA, RMI, RPC etc . . . , and vendor products based on these technologies.

Introduction of an AcA-server as functional block within the 'SDR Terminal-Configuration Control Part' providing multiple functionalities:

Authentication/Authorisation/Encryption/Decryption (providing a firewall mechanism to prevent unauthorised access).

Virtual Configuration (based on the above mentioned sandbox-approach).

Accounting and billing.

The invention claimed is:

1. A computer-readable medium having thereon computer-executable instructions implementing a reconfiguration management architecture for a mobile communications system including a network and at least one software-definable terminal, said architecture comprising a configuration manager located within said terminal to define a proposed configuration for the terminal~ and a configuration controller located within the network, wherein
said configuration manager is arranged
to generate a definition of said proposed configuration within said terminal,
said definition may include information representing configuration rules determined to be permitted by the network for reconfiguration of a terminal type and information identifying a location of software required to implement the proposed configuration,
said definition being used to derive a test procedure to simulate operation of the proposed configuration, and
to supply said definition to said configuration controller, for validation of said proposed configuration by said configuration controller,
said configuration controller is arranged to validate said proposed configuration defined by the configuration manager, validation of the proposed configuration by said configuration controller depending, at least in part, on the result of said test procedure, and
said configuration manager is responsive to validation of said proposed configuration by said configuration controller,
said configuration manager being further arranged to implement said proposed configuration to reconfigure the terminal provided validation of said proposed configuration by said configuration controller has been given.

2. The computer-readable medium as claimed in claim 1 wherein said definition comprises information to enable access to software required to implement the proposed configuration.

3. The computer-readable medium as claimed in claim 2 wherein at least some of said software is stored in a source located within said configuration manager.

4. The computer-readable medium as claimed in claim 3 wherein at least one of said configuration manager and said configuration controller include means authorizing use of or authenticating a source of said software required to implement the proposed configuration.

5. The computer-readable medium as claimed in claim 2 wherein at least one of said configuration manager and/or said configuration controller is adapted to authorize the use of or authenticate a source of said software required to implement the proposed configuration.

6. The computer-readable medium as claimed in claim 1 wherein said configuration manager is arranged to carry out said test procedure and to supply said result to said configuration controller.

7. The computer-readable medium as claimed in claim 1 wherein said configuration controller is arranged to carry out said test procedure.

8. The computer-readable medium as claimed in claim 1 wherein said terminal includes a plurality of reconfigureable modules and said configuration manager includes a controller providing an interface between said configuration manager and said plurality of modules to implement the proposed configuration.

9. The computer-readable medium as claimed in claim 8 wherein said controller also provides an interface between said configuration manager and at least one additional reconfigureable module external to and operationally connected to the terminal.

10. The computer-readable medium as claimed in claim 9 wherein one of said modules comprises a protocol stack, said stack comprises at least one layer, and said proposed configuration is effective to reconfigure one or more element within a single layer of the stack.

11. The computer-readable medium as claimed in claim 9 wherein one of said modules comprises a protocol stack, said stack comprises at least one layer, and said proposed configuration is effective to reconfigure one or more complete layer within the stack.

12. The computer-readable medium as claimed in claim 9 wherein one of said modules comprises a protocol stack and said proposed configuration is effective to reconfigure the complete stack.

13. The computer-readable medium as claimed in claim 8 wherein one of said modules comprises a protocol stack, said stack comprises at least one layer, and said proposed configuration is effective to reconfigure one or more element within a single layer of the stack.

14. The computer-readable medium as claimed in claim 8 wherein one of said modules comprises a protocol stack, said stack comprises at least one layer, and said proposed configuration is effective to reconfigure one or more complete layer within the stack.

15. The computer-readable medium as claimed in claim 8 wherein one of said modules comprises a protocol stack and said proposed configuration is effective to reconfigure the complete stack.

16. The computer-readable medium as claimed in claim 1 wherein said terminal includes a plurality of reconfigureable modules and said test procedure is derived to test for compliance to open interfaces associated with said modules.

17. The computer-readable medium as claimed in claim 1 including a security manager to provide a secure communications channel between said configuration manager and said configuration controller over which validation of the proposed configuration can be carried out.

18. The computer-readable medium as claimed in claim 1 wherein, in the event that the proposed configuration is not validated, said configuration manager generates a new definition of the proposed configuration for validation by said configuration controller.

19. The computer-readable medium as claimed in claim 1 wherein said configuration controller includes an AcA server.

20. The computer-readable medium as claimed in claim 19 including a middleware based configuration software bus providing software communication within said configuration manager.

21. The computer-readable medium as claimed in claim 1 wherein said configuration manager comprises a software store adapted to store software required to implement the proposed configuration,
  a configuration rule store adapted to store configuration rules permitted by the network to reconfigure the terminal,
  a file handler adapted to generate and store said definition of the proposed configuration,
  reconfiguration module controllers providing an interface between said configuration manager and a plurality of reconfigureable modules of the terminal to enable implementation of the proposed configuration and
  wherein the configuration manager is further adapted to control said software store, said configuration rule store, said file handler and said reconfiguration module controllers.

22. A mobile communications system including a network, at least one software-definable terminal and a computer-readable medium having thereon computer-executable instructions implementing a reconfiguration management architecture, said architecture comprising a configuration manager located within said terminal to define a proposed configuration for the terminal and a configuration controller located within the network, wherein
  said configuration manager is arranged
    to generate a definition of said proposed configuration within said terminal,
      said definition may include information representing configuration rules determined to be permitted by the network for reconfiguration of a terminal type and information identifying a location of software required to implement the proposed configuration.
      said definition being used to derive a test procedure to simulate operation of the proposed configuration. and
    to supply said definition to said configuration controller, for validation of
  said proposed configuration by said configuration controller,
  said configuration controller is arranged to validate said proposed configuration defined by the configuration manager, validation of the proposed configuration by said configuration controller depending, at least in part, on a result of said test procedure. and
  said configuration manager is responsive to validation of said proposed configuration by said configuration controller,
  said configuration manager being further arranged to implement said proposed configuration to reconfigure the terminal provided validation of said proposed configuration by said configuration controller has been given.

* * * * *